(12) United States Patent
Engelhardt

(10) Patent No.: US 6,677,579 B2
(45) Date of Patent: Jan. 13, 2004

(54) METHOD AND APPARATUS FOR PHASE CORRECTION OF POSITION AND DETECTION SIGNALS IN SCANNING MICROSCOPY, AND SCANNING MICROSCOPE

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 107 days.

(21) Appl. No.: 09/920,311

(22) Filed: Aug. 3, 2001

(65) Prior Publication Data

US 2002/0024006 A1 Feb. 28, 2002

(30) Foreign Application Priority Data

Aug. 3, 2000 (DE) .......................... 100 37 783

(51) Int. Cl.[7] ................................. H01J 3/14
(52) U.S. Cl. ....................... 250/234; 250/216
(58) Field of Search ................. 250/234, 235, 250/236, 216, 214 R; 348/202, 203; 359/202

(56) References Cited

U.S. PATENT DOCUMENTS

| 4,827,125 A | * | 5/1989 | Goldstein | 250/234 |
| 5,084,612 A | * | 1/1992 | Iwasaki et al. | 250/216 |
| 5,179,276 A | * | 1/1993 | Hakamata | 250/234 |

FOREIGN PATENT DOCUMENTS

JP        11-271626    * 10/1999

* cited by examiner

*Primary Examiner*—Kevin Pyo
*Assistant Examiner*—Seung C. Sohn
(74) *Attorney, Agent, or Firm*—Crowell & Moring LLP

(57) ABSTRACT

A method and an apparatus for phase correction of position and detection signals in scanning microscopy. The method includes generation of a position signal from the position of a beam deflection device (7) and generation, from the light (17) proceeding from the specimen (15), of a detection signal pertinent to the position signal. The position signal and detection signal are then transferred to a processing unit (23). In the processing unit (23), a correction value is determined. The correction value is transferred to a computer (34) to compensate for time differences between the position signal and detection signal.

22 Claims, 3 Drawing Sheets

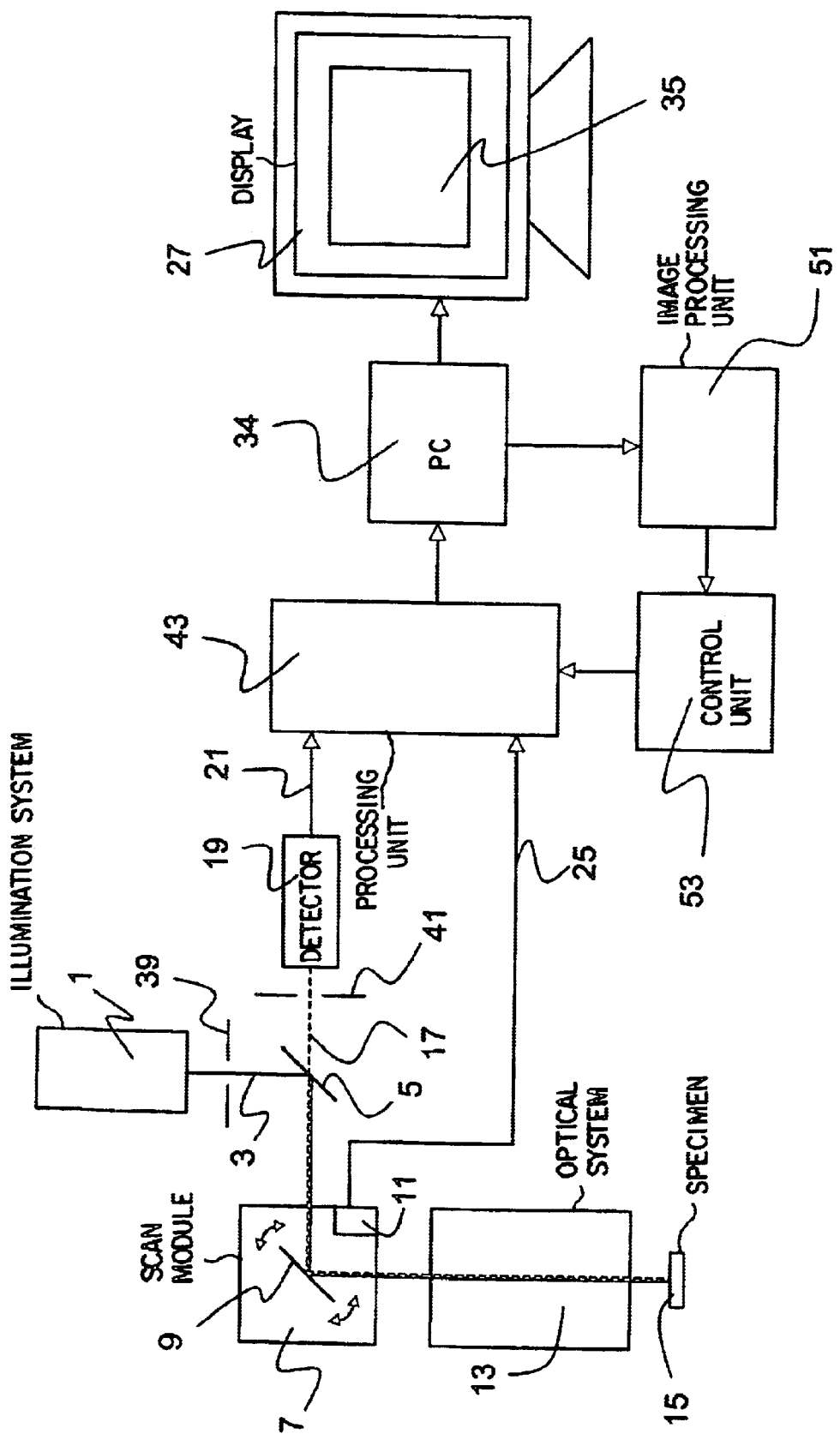

METHOD AND APPARATUS FOR PHASE CORRECTION OF POSITION AND DETECTION SIGNALS IN SCANNING MICROSCOPY, AND SCANNING MICROSCOPE

CROSS REFERENCE TO RELATED APPLICATIONS

This invention claims priority of the German patent application DE 100 37 783.1 which is incorporated by reference herein.

FIELD OF THE INVENTION

The invention concerns a method for phase correction of position and detection signals in scanning microscopy. The scanning microscope can also be configured as a confocal microscope.

The invention furthermore concerns an apparatus for phase correction of position and detection signals in scanning microscopy.

The invention moreover concerns a scanning microscope that makes possible the phase correction of position and detection signals.

BACKGROUND OF THE INVENTION

In scanning microscopy, a sample is illuminated with a light beam in order to observe the reflected or fluorescent light emitted by the sample. The focus of the illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture stop (called the "excitation stop"), a beam splitter, a beam deflection device for beam control, a microscope optical system, a detection stop, and the detectors for detecting the detected light or fluorescent light. The illuminating light is coupled in via a beam splitter. The fluorescent or reflected light coming from the specimen passes by way of the beam deflection device back to the beam splitter, and passes through the latter in order then to be focused onto the detection stop, behind which the detectors are located. Detected light that does not derive directly from the focus region takes a different light path and does not pass through the detection stop, so that a point datum is obtained which results, by sequential scanning of the specimen, in a three-dimensional image. A three-dimensional image is usually achieved by sensing image data in layers.

Ideally, the track of the scanning light beam on or in the specimen describes a meander, i.e. one line is scanned in the X direction with a constant Y position, then X scanning is halted and a Y displacement is used to pivot to the next line to be scanned, and that line is then scanned in the negative X direction with a constant Y position, etc.

The power level of the light coming from the specimen is measured at fixed time intervals during the scanning operation, and thus sampled one scan point at a time. The reading must be unequivocally associated with the pertinent scan position so that an image can be generated from the measurement data. Advantageously, for this purpose the status data of the adjusting elements of the beam deflection device are also continuously measured, or (although this is less accurate) the reference control data of the beam deflection device are used directly.

A precise association of the position signals with the detection signals is particularly important. Transit time differences and the differing processing times of the detectors sensing the signals must be taken into account in the association, for example using delay elements. Very stringent requirements in terms of stability must be applied here: for an image width of 1000 image points, for example, the transit time fluctuations must remain well below 0.1%.

As scanning speed increases, the scanned track deviates more and more from a meander shape. This phenomenon is attributable essentially to the inertia of the moving elements. With rapid scanning, the scanned track is more similar to a sine curve, but it often happens that the trajectory portion for the scan in the positive X direction differs from the trajectory portion when scanning in the negative X direction.

Even if electronic elements are provided to compensate for transit time differences and processing times, a compensation is still performed only upon manufacture of the scanning microscope. Strictly speaking, however, this setting applies to only one scanning speed.

Unfortunately both the signal-carrying elements and the electronic components that are used for compensation, as well as the detectors sensing the reading, are temperature-sensitive, so that association errors occur if the temperature is even slightly variable.

In addition to the problem that compensation is valid for only one scanning speed, an additional complication is the fact that it is valid only for the temperature prevailing at the time the scanning microscope was manufactured.

The compensation errors are evident in particularly disruptive fashion in the context of meander-shaped scanning: the compensation errors for scanning in the positive X direction and for scanning in the negative X directions act in opposite directions, resulting in images with pronounced comb-like distortion.

SUMMARY OF THE INVENTION

It is therefore the object of the invention to describe a method for scanning microscopic preparations with a light beam in which an optimum association of position signals and detection signals is made possible even with changing scan parameters and environmental parameters.

The aforesaid object is achieved by a method comprising the following steps:
  generating a position signal from the position of a beam deflection device and generation, from the light proceeding from the specimen, of at least one detection signal pertinent to the position signal;
  transferring the position signal and detection signal to a processing unit;
  determining a correction value; and
  transferring the correction value to the processing unit to compensate for time differences between the position signal and detection signal.

An additional object of the invention is an apparatus for phase correction of position signals and detection signals in scanning microscopy, with which an optimum association of position signals and detection signals is made possible even with changing scan parameters and environmental parameters.

This object is achieved by means of an apparatus which comprises:

- means for generating a position signal from the position of a beam deflection device, and means for generating, from the light proceeding from the specimen, a detection signal pertinent to the position signal, are provided;
- a processing unit receiving the position signal and the detection signal; and
- means for determining a correction value, which are connected to a processing unit and which transfer to the processing unit the correction value to compensate for time differences between the position signal and detection signal, are provided.

A further object of the invention is to create a scanning microscope which is correspondingly configured to achieve a phase correction of position signals and detection signals of a scanning microscope, an optimum association of position signals and detection signals being made possible even with changing scan parameters and environmental parameters.

This object is achieved by a scanning microscope which comprises: an illumination system for generating a light beam; a scanning module for scanning the light beam over a specimen; at least one detector that receives light proceeding from the specimen; means for generating a position signal from the position of the scanning module; means for generating, from the light proceeding from the specimen, a detection signal pertinent to the position signal; a processing unit receiving the position signal and the detection signal; and means for determining a correction value, which are connected to the processing unit and which transfer to the processing unit the correction value to compensate for time differences between the position signal and detection signal.

The invention has the advantage of proposing to the user several possibilities allowing easy correction of the time difference between the position signal and detection signal. In an advantageous embodiment, adjustment of the time difference is performed directly by the user. For that purpose, sliders are displayed on one of the displays, and adjustment is accomplished by the fact that the user modifies the position of the slider, for example with the mouse, in such a way that a time difference no longer occurs between the position signal and detection signal. The result of the new setting is displayed on the display in real time. For example, a sharp image is visible on the display when the position signal and detection signal are imaged in phase or appropriately corrected.

Automatic setting of the time difference is also possible. A control circuit having a temperature sensor and a data storage unit is provided for this purpose. Correction values pertinent to each scanning speed and temperature, which were ascertained in a series of calibration measurements, are stored in the data storage unit. The temperature is measured continuously or at fixed time intervals, and the correction value pertinent to the measured temperature and the present scanning speed is read out from the data storage unit and the elements for compensating for transit time differences and measured value processing times are set. The correction values can be stored, for example, in the form of a table.

A further embodiment for automatic setting of the transit time compensation comprises a feedback control loop with an image processing software program—as also known, for example, from autofocus systems—which ascertains, from the present image of the specimen, the optimum setting of the transit time compensation in terms of optimum image sharpness. This could be accomplished, for example, by a correlation comparison of the detection signals of adjacent lines.

BRIEF DESCRIPTION OF THE DRAWINGS

The subject matter of the invention is depicted schematically in the drawings, and will be described below with reference to the Figures. In the drawings:

FIG. 3 shows an arrangement according to the present invention with a feedback control system comprising an image processing unit.

DETAILED DESCRIPTION OF THE INVENTION

Figure 1:
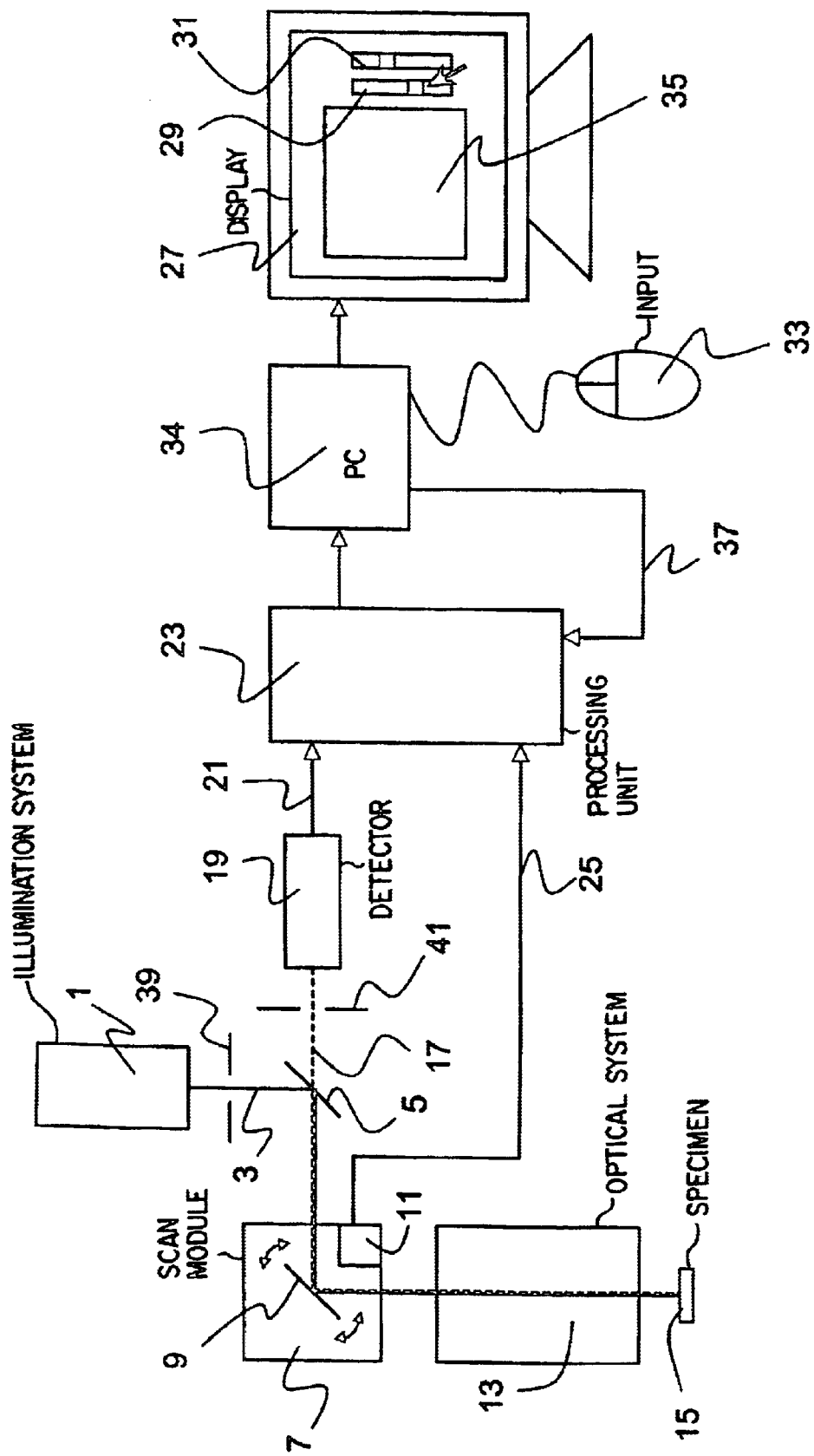
FIG. 1 shows an arrangement according to the present invention with a confocal scanning microscope.

FIG. 1 schematically shows a confocal scanning microscope. Light beam 3 coming from an illumination system 1 is reflected by a beam splitter 5 to scanning module 7, which contains a gimbal-mounted scanning mirror 9 that guides the beam through microscope optical system 13 over or through specimen 15. In the case of non-transparent specimens 15, light beam 3 is guided over the specimen surface. With biological specimens 15 (preparations) or transparent specimens, light beam 3 can also be guided through specimen 15. This means that different focal planes of the specimen are successively scanned by light beam 3. Subsequent assembly then yields a three-dimensional image of the specimen. In all the illustrations (FIGS. 1 through 3), light beam 3 coming from illumination system 1 is depicted as a solid line. Light 17 proceeding from specimen 15 passes through microscope optical system 13 and via scanning module 7 to beam splitter 5, passes through the latter and strikes detector 19, which is embodied as a photomultiplier. In all the illustrations (FIGS. 1 through 3), light 17 proceeding from specimen 15 is depicted as a dashed line. In detector 19, electrical detection signals 21 proportional to the power level of light 17 proceeding from the specimen are generated, and are forwarded to processing unit 23. Position signals 25, sensed in the scanning module by means of an inductively or capacitatively operating position sensor 11, are also transferred to processing unit 23. It is self-evident to one skilled in the art that the position of scanning mirror 9 can also be ascertained by way of the actuation signals. The incoming analog signals are first digitized in processing unit 23. Processing unit 23 comprises two delay elements (not depicted); detection signals 23 pass through one, and position signals 25 through the other. The delay time can be set by the user by way of a PC 34 to which an input unit 33 is connected. A first and a second slider 29 and 31, with which the delay time between the two signals is set, is displayed on a display 27. PC 34 forwards the corresponding data via line 37 to processing unit 23. The position signals and detection signals are associated with one another in processing unit 23 as a function of the particular delay time that is set, and assembled into an image 35 that is displayed on display 27. The user can simultaneously perceive the effects of adjusting slider 29, 31 by way of the sharpness of image 35. Sliders 29, 31 are referred to as "positioning elements." The form in which the positioning elements are displayed on display 35 is immaterial in terms of the invention. Illumination pinhole 39 and detection pinhole 41 that are usually provided in a confocal scanning microscope are shown schematically for the sake of completeness. For better clarity, however, certain optical elements for guiding and shaping the light beams are omitted. These are sufficiently familiar to one skilled in this art.

Figure 2:
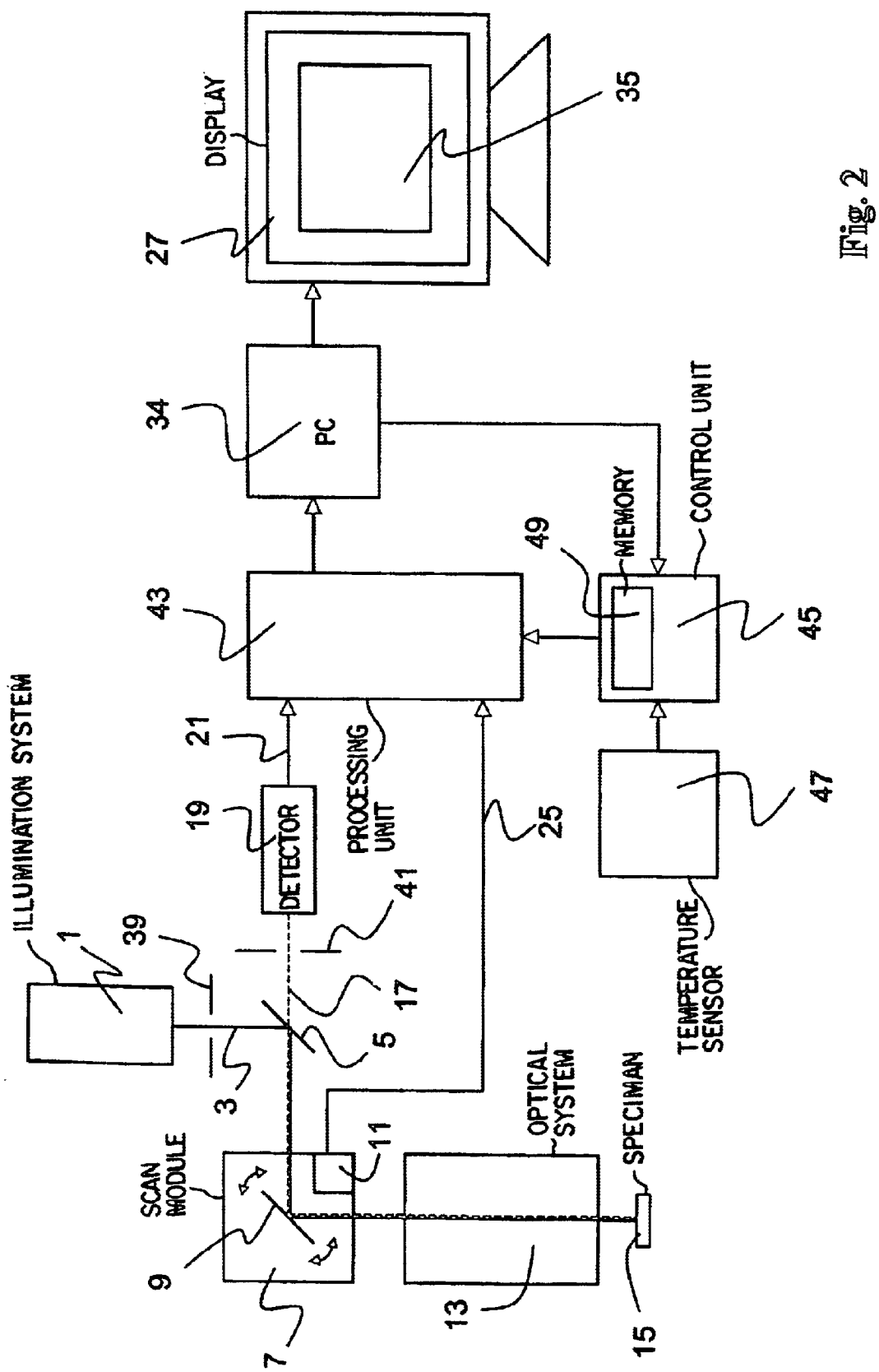
FIG. 2 shows an arrangement according to the present invention with a control system dependent on scanning speed and temperature.

FIG. 2 shows a confocal scanning microscope whose optical portion corresponds to the one in FIG. 1. With this embodiment as well, position signals 25 and detection signals 21 are fed into a processing unit 43 that once again comprises two delay elements (not depicted) of which one has the detection signals passing through it, and the other the position signals. The particular delay time is automatically defined by a control unit 45 that obtains data regarding the present scanning speed from PC 34, and data concerning the present temperature from a temperature sensor 47. Control unit 45 comprises a data memory 49 in which the delay values pertinent to each scanning speed and temperature, which were ascertained in a series of calibration measurements, are stored. The corresponding values can, for example, be stored in data memory 49 in the form of a table. The temperature is measured at fixed time intervals or before each new image acquisition, and associated with the delay values from data memory 49 pertinent to the measured temperature and to the present scanning speed, read out, and forwarded to processing unit 43.

FIG. 3 shows a further configuration according to the present invention, with a confocal microscope in which, exactly as in the case of the arrangements of FIGS. 1 and 2, position signals 25 and detection signals 21 are fed into a processing unit 43 that comprises two delay elements (not depicted) of which one has the detection signals passing through it, and the other the position signals. Here as well, the position signals and detection signals are associated with one another in processing unit 43 as a function of the particular delay time that is set, and are assembled into an image 35 that on the one hand is displayed on display 27 and on the other hand is forwarded to an image processing unit 51 that comprises a computer with a suitable image processing software program. The present distortion level of the image is ascertained in said image processing unit 51. The distortion level results from the fact that because of the inertia of scanning module 7 and the possible delay through detector 19, position signals 21 and detection signals 25 are not processed exactly simultaneously. The association of position data with detected light signals is not exactly coincident, so that a correct image requires a correction. The distortion level that is ascertained is transmitted to a control unit 53, which calculates the delay values to set for optimum sharpness and forwards them to processing unit 43 to establish those values.

The present invention was described with reference to a particular embodiment. It is self-evident, however, that changes and modifications can be made without thereby leaving the range of protection of the claims recited hereinafter.

Parts List

1 Illumination system
3 Light beam
5 Beam splitter
7 Scanning module 7
9 Scanning mirror
11 Position sensor
13 Microscope optical system
15 Specimen
17 Light proceeding from specimen 15
19 Detector, photomultiplier
21 Detection signals
23 Processing unit
25 Position signals
27 Display
29 First slider
31 Second slider
33 Input unit
34 PC
35 Image of specimen 15
37 Line
39 Illumination pinhole
41 Detection pinhole
43 Processing unit
45 Control unit
47 Temperature sensor
49 Data memory
51 Image processing unit
53 Control unit

What is claimed is:

1. A method for phase correction of position and detection signals in scanning microscopy, comprising the following steps:

generating a position signal from the position of a beam deflection device and generating, from the light proceeding from a specimen, at least one detection signal pertinent to the position signal;

transferring the position signal and detection signal to a processing unit;

determining a correction value from at least one of captured image data and existing environmental data; and transferring the correction value to the processing unit to compensate for time differences between the position signal and detection signal.

2. The method as defined in claim 1, wherein the correction value is ascertained from the setting of positioning elements displayed on a display and from the overall impression, resulting therefrom, of an image of the specimen displayed on the display.

3. The method as defined in claim 1, wherein the correction value is ascertained automatically.

4. The method as defined in claim 3, wherein the correction value is ascertained by means of a temperature measurement and comparison with calibration data.

5. The method as defined in claim 1, wherein the correction value is ascertained by means of an image processing unit from the present distortion level of the image.

6. The method as defined in claim 1, wherein the time difference between the position signal and the detection signal is controlled in open-and/or closed-loop fashion as a function of the speed with which the light beam is guided over or through the specimen.

7. The method as defined in claim 6, wherein the position signals and detection signals are associated with one another in space and in time by application of the correction value.

8. The method as defined in claim 1, wherein the position signals and detection signals are processed according to a definable algorithm, and are displayed on the display in the form of an image of at least a portion of the specimen.

9. An apparatus for phase correction of position and detection signals in scanning microscopy, comprising:

means for generating a position signal from the position of a beam deflection device, and means for generating, from the light proceeding from a specimen, a detection signal pertinent to the position signal;

a processing unit receiving the position signal and the detection signal; and means for determining a correction value, from at least one of captured image data and existing environmental data which is connected to the processing unit and which transfers to the processing unit the correction value to compensate for time differences between the position signal and detection signal.

10. The apparatus as defined in claim 9, wherein the apparatus comprises a display and the means for determining a correction value comprises positioning elements displayed on the display, by the adjustment of which the correction value can be ascertained from the overall impression, resulting therefrom, of an image of the specimen displayed on the display.

11. The apparatus as defined in claim 9, wherein means which automatically ascertains the correction value is provided.

12. The apparatus as defined in claim 11, wherein the means for automatically ascertaining the correction value is a temperature sensor which is connected to a control unit that comprises a data memory, the control unit supplying data to the processing unit.

13. The apparatus as defined in claim 9, wherein the means for determining a correction value comprises an image processing unit which is connected to a control unit and ascertains the correction value from the present distortion level of an image.

14. The apparatus as defined in claim 13, wherein the control unit is connected to the processing unit which performs the association of the position signal and detection signal.

15. The apparatus as defined in claim 9, wherein means for digitization or for conversion into electronically processable information is provided.

16. A scanning microscope comprising: an illumination system for generating a light beam; a scanning module for scanning the light beam over a specimen; at least one detector means that receives light proceeding from the specimen; means for generating a position signal from the position of the scanning module; said detector means including means for generating, from the light proceeding from the specimen, a detection signal pertinent to the position signal; a processing unit receiving the position signal and the detection signal; and means for determining a correction value; from at least one of display and environmental data which are connected to the processing unit and which transfer to the processing unit the correction value to compensate for time differences between the position signal and detection signal.

17. The scanning microscope as defined in claim 16, wherein a display is provided and the means for determining a correction value comprises at least one positioning element displayed on the display, by the adjustment of which the correction value can be ascertained from the overall impression, resulting therefrom, of an image of the specimen displayed on the display.

18. The scanning microscope as defined in claim 16, wherein means which automatically ascertains the correction value is provided.

19. The scanning microscope as defined in claim 18, wherein a temperature sensor is provided as the means which automatically ascertaining the correction value, a control unit is connected to the processing unit, wherein the control unit has a data memory.

20. The scanning microscope as defined in claim 16, wherein the means for determining a correction value is an image processing unit which is connected to a control unit and ascertains the correction value from the present distortion level of the image.

21. The scanning microscope as defined in claim 20, wherein the control unit is connected to the processing unit which performs the association of the position signal and detection signal.

22. The scanning microscope as defined in claim 16, wherein means for digitization or for conversion into electronically processable information is provided.

* * * * *